(12) United States Patent
Chan

(10) Patent No.: US 11,706,546 B2
(45) Date of Patent: Jul. 18, 2023

(54) IMAGE SENSOR WITH INTEGRATED SINGLE OBJECT CLASS DETECTION DEEP NEURAL NETWORK (DNN)

(71) Applicant: Sony Semiconductor Solutions Corporation, Kanagawa (JP)

(72) Inventor: Kevin Chan, San Jose, CA (US)

(73) Assignee: Sony Semiconductor Solutions Corporation, Kanagawa (JP)

( * ) Notice: Subject to any disclaimer, the term of this patent is extended or adjusted under 35 U.S.C. 154(b) by 100 days.

(21) Appl. No.: 17/335,794

(22) Filed: Jun. 1, 2021

(65) Prior Publication Data
US 2022/0383020 A1 Dec. 1, 2022

(51) Int. Cl.
*H04N 25/79* (2023.01)
*G06V 40/16* (2022.01)
*G06V 10/82* (2022.01)

(52) U.S. Cl.
CPC ............. *H04N 25/79* (2023.01); *G06V 10/82* (2022.01); *G06V 40/161* (2022.01); *G06V 40/168* (2022.01)

(58) Field of Classification Search
CPC ...... H04N 5/379; G06V 10/82; G06V 10/454; G06V 40/161; G06V 40/168; G06V 20/60; G06N 3/08
See application file for complete search history.

(56) References Cited

U.S. PATENT DOCUMENTS

| | | | |
|---|---|---|---|
| 7,409,091 B2 * | 8/2008 | Sung | G06V 40/165 382/280 |
| 10,757,377 B2 * | 8/2020 | Wang | H04N 7/18 |
| 10,795,024 B2 * | 10/2020 | Eki | H04N 5/23225 |
| 10,963,745 B2 * | 3/2021 | Srivastava | G06V 40/161 |
| 11,144,749 B1 * | 10/2021 | Lo | H04N 7/181 |

(Continued)

FOREIGN PATENT DOCUMENTS

| | | | | |
|---|---|---|---|---|
| CN | 107871101 A | * | 4/2018 | |
| CN | 108230292 A | * | 6/2018 | ......... G06K 9/00228 |

(Continued)

OTHER PUBLICATIONS

M. F. Amir, D. Kim, J. Kung, D. Lie, S. Yalamanchili and S. Mukhopadhyay, "NeuroSensor: A 3D image sensor with integrated neural accelerator," 2016 IEEE SOI-3D-Subthreshold Microelectronics Technology Unified Conference (S3S), 2016, pp. 1-2, doi: 10.1109/S3S.2016.7804406. (Year: 2016).*

(Continued)

*Primary Examiner* — John Villecco
(74) *Attorney, Agent, or Firm* — Michael Best & Friedrich LLP

(57) ABSTRACT

An image sensor, electronic device and method thereof that performs on-sensor single object class detection using an on-sensor single object class detection deep neural network (DNN), such as a face detection DNN. The single object class detection DNN includes a pixel array layer configured to capture an image and transfer image data of the captured image, and a logic and single object class detection deep neural network (DNN) layer that receives the image data directly from the pixel array layer and outputs the image data with the single object class detection data to a communication bus of an electronic device.

18 Claims, 8 Drawing Sheets

(56) References Cited

U.S. PATENT DOCUMENTS

| | | | |
|---|---|---|---|
| 2017/0147905 A1* | 5/2017 | Huang | G06V 40/165 |
| 2017/0177997 A1* | 6/2017 | Karlinsky | G06V 10/82 |
| 2017/0353699 A1* | 12/2017 | Wang | G08B 13/19695 |
| 2018/0004275 A1* | 1/2018 | Tubbs | G06F 1/3287 |
| 2018/0032796 A1* | 2/2018 | Kuharenko | G06K 9/6274 |
| 2018/0181796 A1* | 6/2018 | Wang | G06V 40/161 |
| 2019/0019020 A1* | 1/2019 | Flament | G06V 30/40 |
| 2019/0034748 A1* | 1/2019 | Matsumoto | G06N 3/0454 |
| 2019/0035154 A1 | 1/2019 | Liu | |
| 2019/0087690 A1* | 3/2019 | Srivastava | G06F 1/3296 |
| 2019/0147592 A1* | 5/2019 | Yu | G06V 10/764 382/128 |
| 2019/0204448 A1* | 7/2019 | Eki | H04N 5/225 |
| 2019/0244056 A1 | 8/2019 | Roy | |
| 2019/0385024 A1* | 12/2019 | Croxford | G06N 3/08 |
| 2020/0142421 A1* | 5/2020 | Palanisamy | G06N 3/0445 |
| 2020/0195875 A1* | 6/2020 | Berkovich | H04N 5/23225 |
| 2020/0321374 A1* | 10/2020 | Ion | G06N 3/02 |
| 2021/0044742 A1 | 2/2021 | Berkovich et al. | |
| 2021/0103778 A1* | 4/2021 | Lee | G06N 3/04 |
| 2021/0105426 A1* | 4/2021 | Matsumoto | H04N 5/379 |
| 2021/0152732 A1 | 5/2021 | Eki | |
| 2021/0168318 A1* | 6/2021 | Eki | G06V 10/82 |
| 2021/0185264 A1* | 6/2021 | Wong | H04N 5/378 |
| 2021/0185265 A1* | 6/2021 | Wong | H04N 5/343 |
| 2021/0185266 A1* | 6/2021 | Chan | G06V 10/147 |
| 2021/0266488 A1* | 8/2021 | Eki | G06K 9/6256 |
| 2021/0305295 A1* | 9/2021 | Ion | G06V 10/764 |
| 2021/0385403 A1* | 12/2021 | Eki | H01L 27/14647 |
| 2021/0397812 A1* | 12/2021 | Bharati | G06N 3/04 |
| 2022/0164570 A1* | 5/2022 | Wang | G06K 9/6268 |
| 2023/0039592 A1* | 2/2023 | Chan | G06T 7/246 |

FOREIGN PATENT DOCUMENTS

| | | | | |
|---|---|---|---|---|
| CN | 112052703 A | * | 12/2020 | |
| WO | WO-2018052714 A2 | * | 3/2018 | B60Q 9/008 |
| WO | WO-2020027161 A1 | * | 2/2020 | G06K 9/00805 |
| WO | WO-2021226411 A | * | 11/2021 | G02B 27/017 |

OTHER PUBLICATIONS

S. Mukhopodhyay et al., "The CAMEL approach to stacked sensor smart cameras," 2018 Design, Automation & Test in Europe Conference & Exhibition (DATE), 2018, pp. 1299-1303, doi: 10.23919/DATE.2018.8342214. (Year: 2018).*

International Search Report and Written Opinion dated Aug. 3, 2022 for corresponding International Application No. PCT/US2022/020344.

Vivet et al. Advanced 3D Technologies and Architectures for 3D Smart Image Sensors. Mar. 25, 2019 (Mar. 25, 2019). [retrieved on Jun. 22, 2022]. Retrieved from the Internet: <URL: https://ieeexplore.ieee.org/documenV8714886> pp. 674-679.

Amir et al. 3-D Stacked Image Sensor With Deep Neural Network Computation. May 15, 2018 (May 15, 2018). [retrieved on Jun. 22, 2022]. Retrieved from the Internet: <URL: https://ieeexplore.ieee.org/documenV8320784> pp. 4187-4199.

* cited by examiner

Layer-by-Layer Convolution Processing

IMAGE SENSOR WITH INTEGRATED SINGLE OBJECT CLASS DETECTION DEEP NEURAL NETWORK (DNN)

BACKGROUND OF THE INVENTION

1. Field of the Invention

This application relates generally to image sensors. More specifically, this application relates to a system and method with an on-sensor, single object class detection deep neural network (DNN), which is integrated in an image sensor (e.g., a complementary metal-oxide-semiconductor (CMOS) image sensor, a stacked CMOS sensor). For example, the single object class may be a face (e.g., thereby providing a facial detection DNN).

2. Description of Related Art

Object detection (e.g., face detection) functions are commonly used with electronic image capturing devices (e.g., image sensors, cameras, smartphones with cameras). Current object/face detection techniques utilize deep neural networks (DNNs) that require a lot of memory and are computationally intensive. However, existing DNNs for object detection (e.g., facial detection) are too large (memory-wise) and computationally intensive for an on-sensor implementation. Therefore, the existing DNNs must be performed on a processor separate and distinct from the image sensor.

Typically, object detection is performed on a general-purpose processor that is separate from a camera/sensor. Object detection is performed on the separate processor which is coupled to the camera system by a communication bus. Thus, image data must be transferred from the camera to the processor to perform the object detection.

Additionally, the object detection is performed using existing algorithms which either suffer from low accuracy (e.g., Haar-like features, Histogram of Oriented Gradients (HoG), Scale Invariant Feature Transform (SIFT) features), or require too much memory for on-sensor implementation (e.g., Multi-task Cascaded Convolutional Neural Networks).

BRIEF SUMMARY OF THE INVENTION

An electronic imaging device (e.g., a CMOS sensor) of the present disclosure is an on-sensor implementation of a single object class (e.g., faces) detection with high accuracy, while maintaining low memory usage and low computational complexity. For example, a sensor of the present disclosure is a low-power sensor having a memory footprint size that is smaller than a specific value (e.g., 100 kB).

In one aspect of the present disclosure, there is provided a stacked image sensor comprising: a pixel array layer configured to capture an image and transfer image data of the captured image, and a logic and single object class detection deep neural network (DNN) layer, the logic and single object class detection DNN layer including a single object class detection DNN. The logic and the single object class detection DNN layer may be configured to: receive the image data directly from the pixel array layer, perform preprocessing of the image data to generate preprocessed image data, perform single class object detection with the single object class detection DNN using at least a portion of the preprocessed image data, perform postprocessing of single object class detection data output by the single object class detection DNN, and output the image data in combination with the postprocessed single object class detection data to a communication bus of an electronic device.

In another aspect of the present disclosure, there is a method comprising: storing a single object class deep neural network (DNN) in a logic and single object class detection DNN layer of a stacked image sensor; capturing, by a pixel array layer of the stacked image sensor, an image; transferring, by the pixel array layer, image data of the captured image to the logic and single object class detection deep neural network (DNN) layer of the stacked image sensor; performing, by the logic and single object class detection DNN, preprocessing of the image data to generate preprocessed image data; performing, by the logic and single object class detection DNN layer, single object class detection using at least a portion of the preprocessed image data as input; performing, by the logic and single object class detection DNN, postprocessing of single object class detection data output by the single object class detection DNN, and outputting, by the logic and single object class detection DNN, the captured image in combination with the postprocessed single object class detection data to a communication bus of an electronic device.

In one aspect of the present disclosure, there is provided an electronic device comprising: a processor, a memory, an optical lens, a communications bus, and a stacked image sensor. The stacked image sensor comprises: a pixel array layer configured to capture an image and transfer image data of the captured image and a logic and single object class detection deep neural network (DNN) layer.

The logic and single object class detection DNN layer include a single object class detection DNN.

The logic and the single object class detection DNN layer is configured to: receive the image data directly from the pixel array layer; perform preprocessing of the image data to generate preprocessed image data, perform single object class detection with the single object class detection DNN using at least a portion of the preprocessed image data, perform postprocessing of single object class detection data output by the single object class detection DNN, and output the image data in combination with the postprocessed single object class detection data to the communications bus.

In this manner, the above aspects of the present disclosure provide for improvements in at least the technical field of imaging, as well as the related technical fields of image sensor architecture, image processing, facial detection, and the like.

This disclosure can be embodied in various forms, including hardware or circuits controlled by computer-implemented methods, computer program products (e.g., transitory or non-transitory computer readable media), computer systems and networks, user interfaces, and application programming interfaces; as well as hardware-implemented methods, signal processing circuits, image sensor circuits, application specific integrated circuits, field programmable gate arrays, and the like. The foregoing summary is intended solely to give a general idea of various aspects of the present disclosure and does not limit the scope of the disclosure in any way.

DESCRIPTION OF THE DRAWINGS

These and other more detailed and specific features of various embodiments are more fully disclosed in the following description, reference being had to the accompanying drawings, in which.

DETAILED DESCRIPTION

In the following description, numerous details are set forth, such as flowcharts, data tables, and system configurations. It will be readily apparent to one skilled in the art that these specific details are merely examples and not intended to limit the scope of this application.

Moreover, while the present disclosure focuses mainly on examples in which the DNNs are used in image sensors, it will be understood that this is merely one example of an implementation. It will further be understood that the disclosed devices, systems and methods can be used in any device in which there is a need to perform face detection of captured images, for example, in a smartphone or tablet, and the like. Furthermore, the image sensor implementations described below may be incorporated into an electronic apparatus, including but not limited to a smartphone, a tablet computer, a laptop computer, and the like.

Imaging Device

Figure 1:
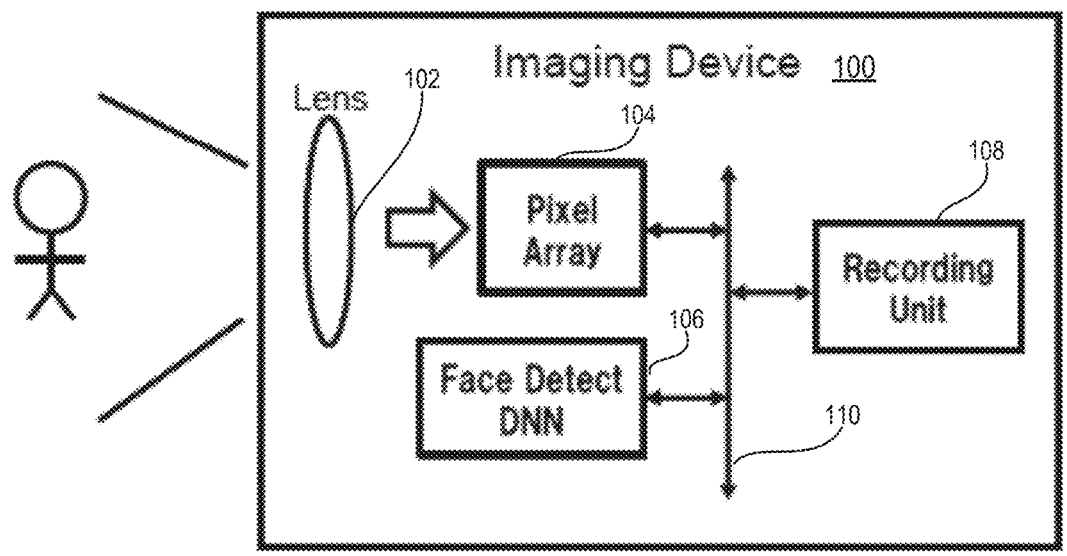
FIG. 1 is a diagram illustrating an imaging device, in accordance with various aspects of the present disclosure.

FIG. 1 illustrates an electronic imaging device 100 according to various aspects of the present disclosure. The electronic imaging device 100 is a camera, a smartphone, a tablet or the like.

As shown in FIG. 1, according to an embodiment, an imaging device 100 comprises an optical lens 102, a pixel array unit 104, a face detection DNN module 106, a recording unit 108 (e.g., a memory) and a communication bus 110. The pixel array unit 104 may be an image sensor that has millions (e.g., up to tens of millions) of pixel circuits ("megapixels" or MP) or more. The face detection DNN module will be used as an example embodiment of the single object class DNN module for illustrative purposes.

The face detection DNN module 106 is implemented by a hardware processor or hardware circuitry and also includes a memory (e.g., dynamic random access memory (DRAM), static random access memory (SRAM) or synchronous DRAM (SDRAM)). As shown in FIG. 1 by way of a single direction arrow, the lens 102 receives light that is transferred to the pixel array 104. As shown in FIG. 1, the pixel array 104, the face detection DNN 106, and the recording unit 108 all communicate with (transfer information to and receive information from) each other via communication bus 110.

The face detection DNN 106 is configured to output information to another electronic device (e.g., an application hardware processor), such as a server or external processor. The face detection DNN 106 may also be configured to receive information from the other electronic device, such as a processor.

Figure 2:
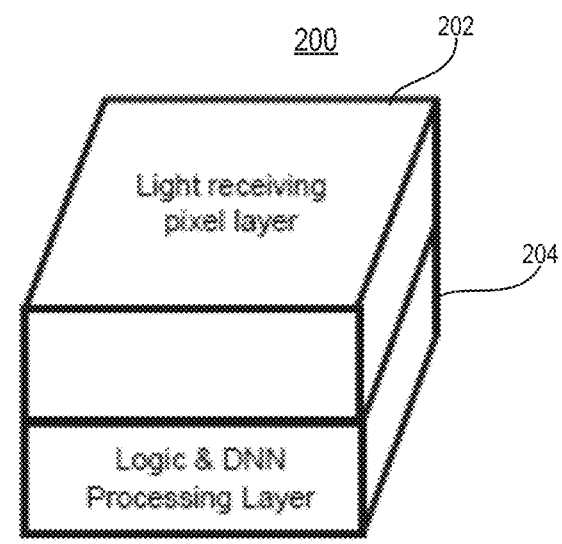
FIG. 2 is a diagram illustrating a stacked image sensor, in accordance with various aspects of the present disclosure.

FIG. 2 is a diagram illustrating an example of stacked image sensor 200, in accordance with various aspects of the present disclosure. As shown in FIG. 2, the stacked image sensor 200 comprises a light receiving pixel layer 202, and a logic and face detection DNN processing layer 204.

The light receiving pixel layer 202 is configured to capture an image and output image data of the captured image to the logic and face detection DNN processing layer 204. The logic and face detection DNN processing layer 204 includes hardware (e.g., one or more of a processor, a graphics processor, a memory (e.g., DRAM or SDRAM), and the like) that performs logic functionality (e.g., see FIGS. 7-9 below) and DNN processing, such as the face detection DNN processing described below.

According to an embodiment, as shown in FIG. 2, the stacked image sensor 202 includes the light receiving pixel layer 202 being stacked on top of (located above) the logic and face detection DNN processing layer 204 in a stacking direction. The two layers are be electrically connected to each other, as shown in FIG. 2, such as by a through-silicon via (TSV).

The stacked image sensor provides the pixel layer 202 and the logic and face detection DNN processing layer 204 on one chip (e.g., a stacked integrated circuit). For example, the sensor is a low-power sensor having a memory footprint size that is smaller than a specific value (e.g., 100 kB). The reduced size of the face detection DNN allows the logic and face detection DNN processing layer 204 to be implemented in hardware with a small area footprint, thereby enabling implementation on a low-power image sensor.

Although referred to as a "face" DNN, the DNN may be any single class DNN and is not limited to just face object detection. Face object detection is one example of a single object class. However, other single object classes could be used rather than a face object. For example, a different single object class DNN could be implemented, such as a pedestrian detect DNN, a fingerprint detect, or other suitable single object class DNNs. According to various embodiments, multiple class DNNs may be used for the object detect DNN instead of a single object class DNN. For example, two object classes (e.g., pedestrians and vehicles) could be used instead of the single object class. As another example, more than two object classes could be used for the object detect DNN.

Figure 3:
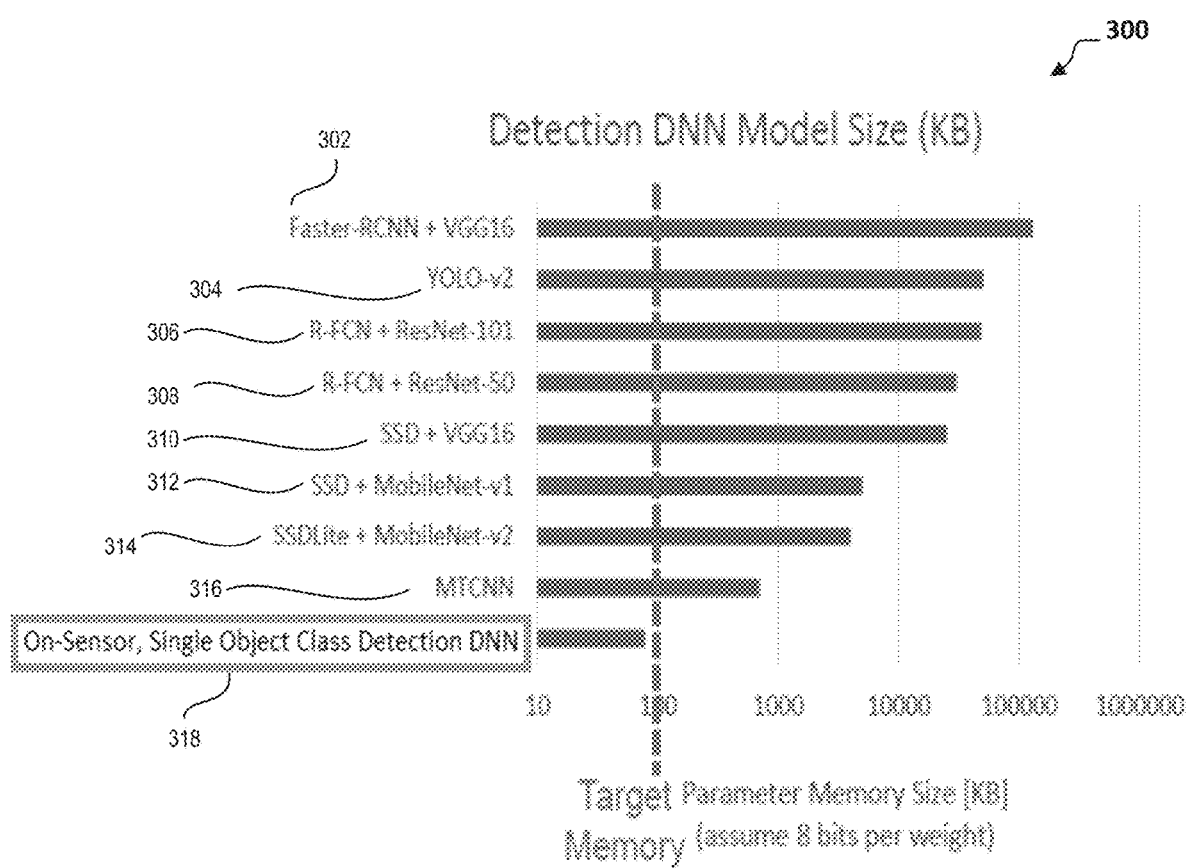
FIG. 3 is a diagram illustrating memory footprints of DNNs, in accordance with various aspects of the present disclosure.

FIG. 3 is a diagram illustrating memory footprint sizes of DNNs 302-318, in accordance with various aspects of the present disclosure. As shown in FIG. 3, conventional DNNs (e.g., Faster-Region Based Convolutional Neural Networks (RCNN)+Visual Geometry Group (VGG)16 (302), You Only Look Once (YOLO)-v2 (304), Region-Based Fully Convolutional Networks (R-FCN)+Residual Neural Network (ResNet)-101 (306), R-FCN+ResNet-50 (308), Single-Shot Detector (SSD)+VGG16 (310), SSD+MobileNet-v1 (312), SSDLite+MobileNet-v2 (314)) were too large for certain low-power image sensors (e.g., a stacked CMOS image sensor). However, as shown in FIG. 3, the on-sensor, single object class detection DNN 318, according to various embodiments of the disclosure, has a lower memory footprint than the conventional detection DNN models 302-316.

Figure 4:
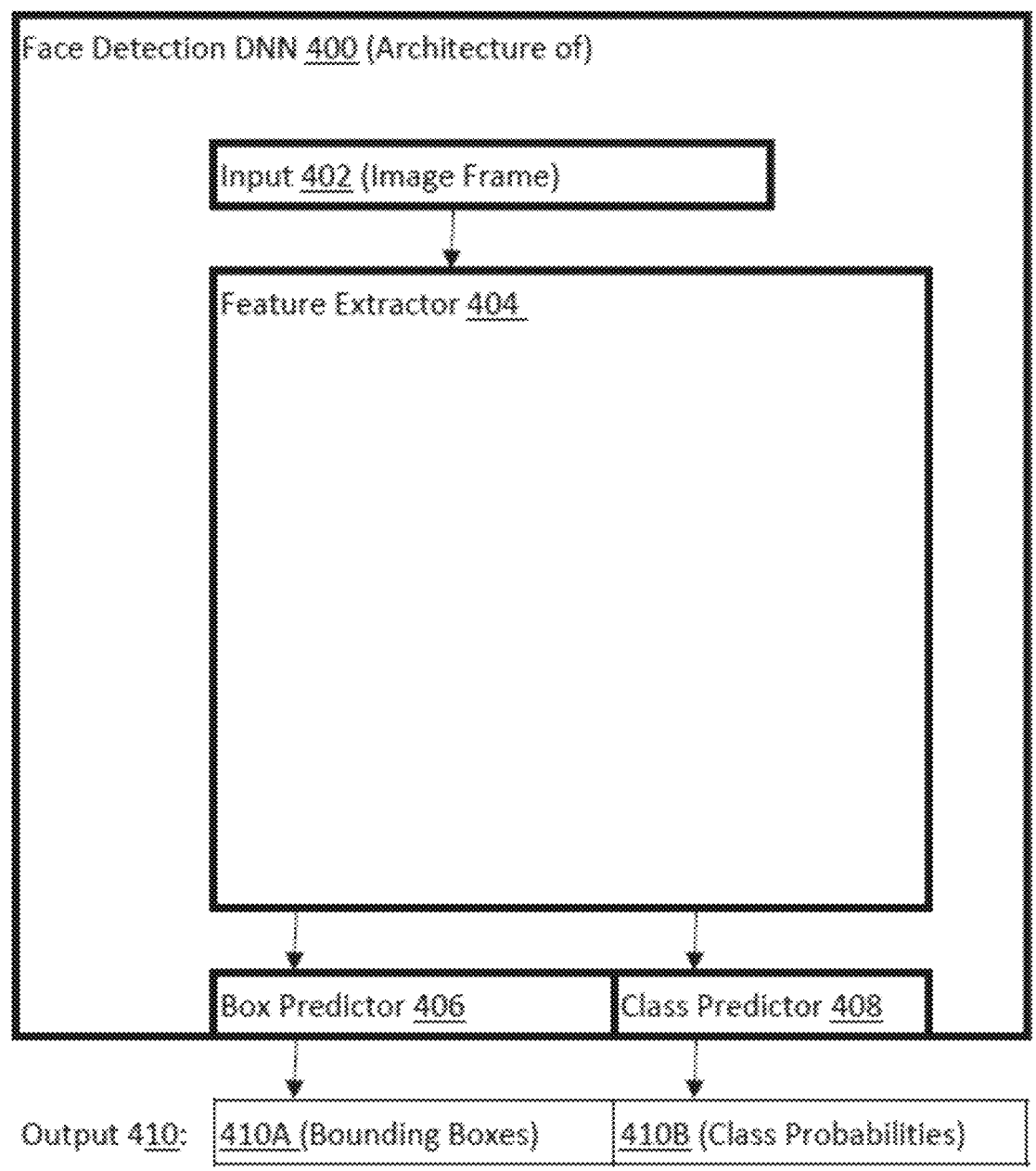
FIG. 4 is a diagram illustrating a face detection DNN, in accordance with various aspects of the present disclosure.

As shown in FIG. 3, the DNN architecture of the present disclosure for face detection (e.g., the on-sensor, single object class detection DNN 400 of FIG. 4) has a smaller memory footprint than the related technology. For example, according to some embodiments, the DNN model has a memory footprint that is 100 kB or less. As discussed below with reference to FIGS. 4-9, the image sensor (e.g., the stacked image sensor 200), according to various embodiments, has a combination of architecture and algorithmic structures for efficient hardware implementation of the single object class detection DNN into a low-power CMOS image sensor, as an example. The disclosure describes the combination of architecture and algorithmic structures to reduce memory and power that are specific to single object class (e.g., face class) detection and neural network processing, and how the single object class (e.g., face) detection output can be used as a trigger to control the behavior of an image sensor.

On-Sensor, Single Object Class Detection DNN

FIG. 4 is a diagram illustrating an example of a single object class (e.g., face) detection DNN 400, in accordance with various aspects of the present disclosure. Although a face detection DNN 400 is shown as an embodiment, other single object classes or multiple object classes may be used, as previously discussed above. Face detection DNN 400 is one example of the on-sensor, single object class detection DNN 318 of FIG. 3. In contrast to facial recognition or object recognition (i.e., identity matching), the face detection DNN 400 according to various embodiments of the disclosure may have a goal of identifying whether a single object (e.g., a face (any face)) is present in an image, and to use this single object class detection (e.g., face detection) information as a trigger to control the behavior of an image sensor (see, e.g., FIGS. 7-9 below). The input of the face detection DNN 400 may be an image region that may or may not contain the single object class (in this example, a face). The output of the face detection DNN 400 may include a set of bounding boxes indicating the location of any faces in the input image data.

As shown in FIG. 4, the face detection DNN 400 includes an input image 402 being received and processed by a feature extractor module 404, which may comprise of a plurality of convolutional blocks and inverted residual blocks. Further, a subset of convolutional block outputs and/or residual block outputs from the feature extractor 404 are processed by a box predictor module 406 to identify the size and location of bounding boxes of potential faces (output 410A: bounding boxes). The same subset of convolutional block outputs and/or residual block outputs from the feature extractor 404 are processed by a class predictor module 408 to determine the probability that the corresponding bounding box contains a face (output 410B: class probabilities).

In this context, a convolutional block refers to a set of one or more convolutional layers connected sequentially, where each convolutional layer is followed by a nonlinear activation function such as a rectified linear unit (ReLU). In this context, an inverted residual block refers to a set of one or more convolutional layers, depthwise convolutional layers, and ReLU layers, where the output of the block is summed together with the input of the block.

To ensure the face detection DNN 400 is implementable on memory constrained hardware, the output size for each convolutional block and each inverted residual block is no larger than the available working memory in the hardware of the logic and face detection DNN processing layer 204 (e.g., lower than 100 kB). To ensure the face detection DNN 400 is implementable on memory constrained hardware, the total memory size of the weights in all convolutional blocks and all inverted residual blocks is no larger than the available weight memory in hardware (e.g., less than 100 kB).

The face detection DNN 400 described in FIG. 4 (face detection architecture) may be an architecture based on MobileNet v2+SSDLite that has been modified to reduce the memory size of the DNN model (via one or more modifications). The one or more modifications, which may occur during training, preprocessing and/or postprocessing, may include one or more of: (i) reduced image input size (e.g., to 160×120 and/or grayscale), (ii) reduce the number of output channels in each layer of the face detection DNN, (iii) change/adjust the convolution stride in some layers of the DNN, (iv) reduce the number of anchor boxes of the DNN, and (v) reduce the number of object classes to 1 (e.g., face). In addition, while MobileNet v2+SSDLite is a general purpose object detection DNN, this face detection DNN 300 is trained specifically for face detection. Although the object class is 1 and is a "face," another single class could be used (e.g., pedestrians or another body part), as an example.

Layer-By-Layer Convolution Processing

Figure 5:
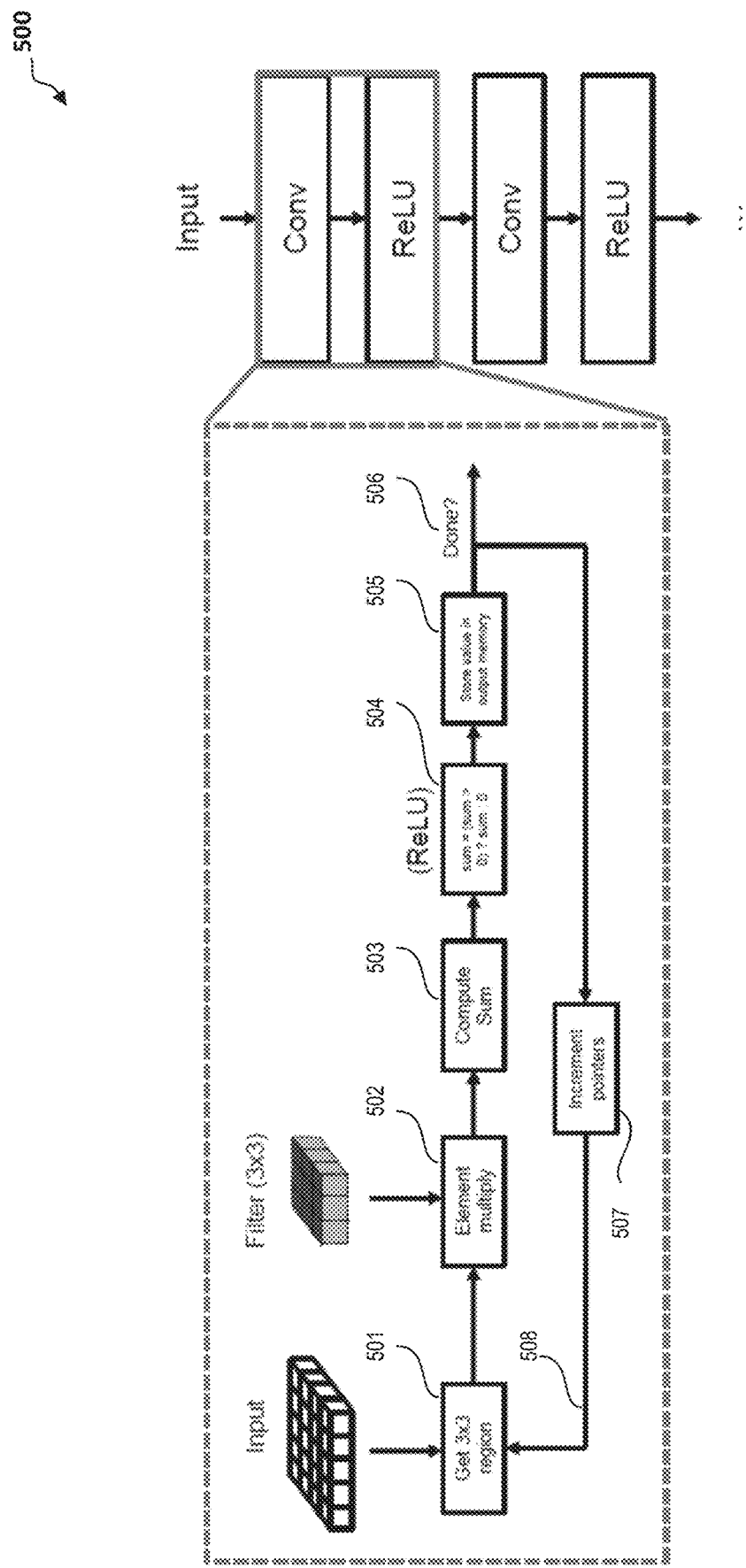
FIG. 5 is a diagram illustrating a layer-by-layer convolution processing, in accordance with various aspects of the present disclosure.

FIG. 5 is a diagram illustrating a layer-by-layer convolution processing 500, in accordance with various aspects of the present disclosure. Neural network processing may be performed in a layer-by-layer manner if sufficient working memory is available to store the intermediate activations from each layer. As shown in FIG. 5, the layer-by-layer convolution processing 500 includes processing and storing the result of each "Conv+ReLU" layer at all (row, column) positions, as shown in FIG. 5. For example, as shown in FIG. 5, the layer-by-layer convolution processing 500 includes one or more of Operations 501-508. According to an embodiment, an image region (e.g., for each output (row, column) position, a region from an input buffer (e.g., a 3 pixel×3 pixel (3×3) region from a larger input buffer)) is obtained (Operation 501). A same-sized filter (e.g., 3×3) is used to perform an element multiply function (Operation 502). In addition, a compute sum function (Operation 503), and an ReLU function (Operation 504) is also performed. For example, as shown in FIG. 5, the ReLU function 504 may be:

$$\text{sum}=(\text{sum}>0)?\text{sum}: 0) \qquad [\text{Equation 1}]$$

Values are stored in output memory (Operation 505). A check is performed to determine whether the layer-by-layer convolution processing has computed each of the output (row, column, channel) positions (Operation 506). If each of the output (row, column, channel) positions has not been computed, pointers are incremented (Operation 507) and a loop that causes Operations 501-506/507 to restart (to be performed again) is used (Operation 508). If each of the output (row, column, channel) positions has been computed, the processing is completed for the given layer, and the processing for the subsequent layer may begin.

Multi-Layer Convolution Processing

Figure 6:
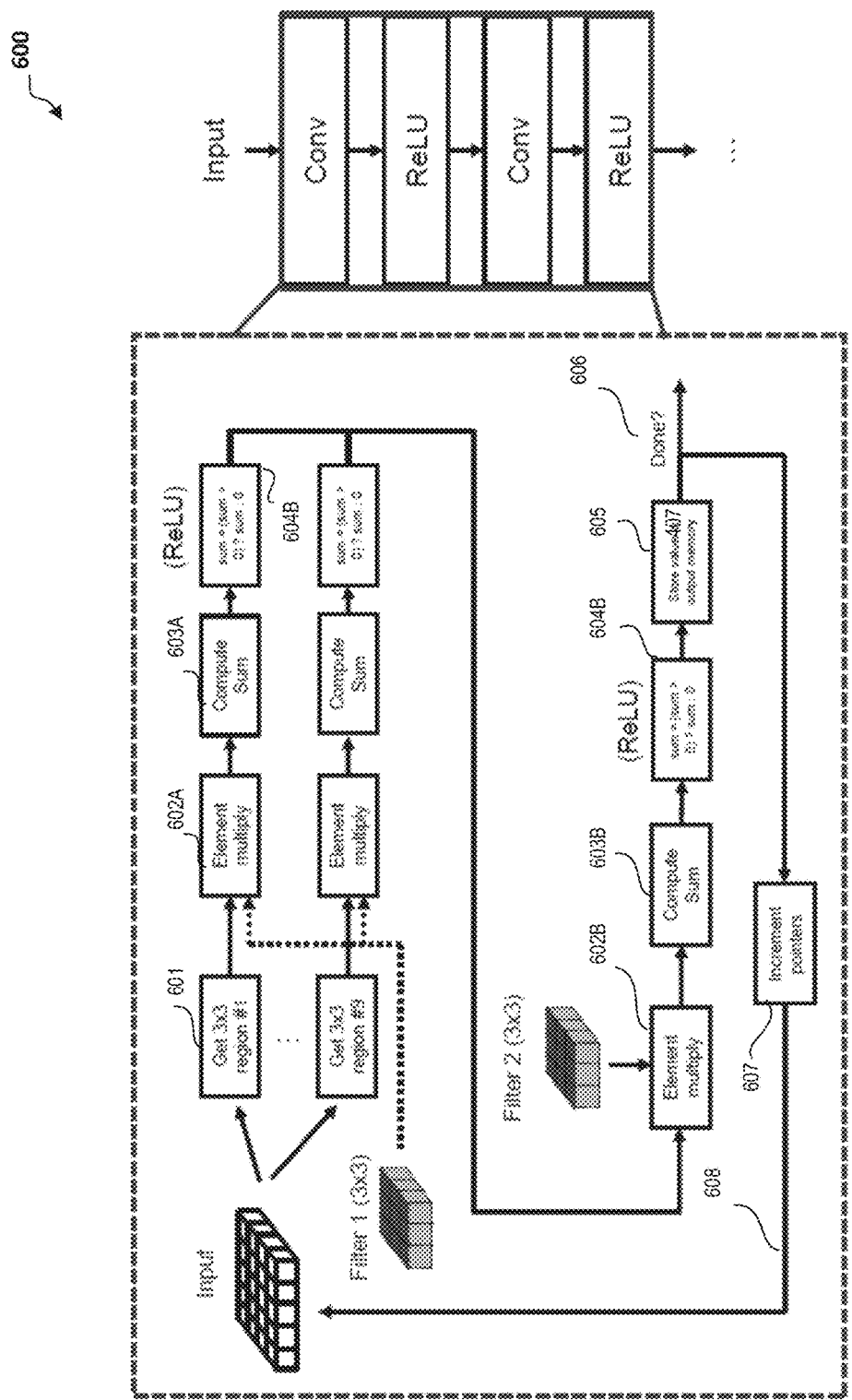
FIG. 6 is a diagram illustrating a multi-layer convolution processing, in accordance with various aspects of the present disclosure.

Alternatively, to reduce working memory for intermediate layer activations, a multi-level convolution procedure may be performed, where multiple convolution layers are computed together for a given spatial coordinate, rather than computing each entire convolution for all spatial coordinates. FIG. 6 is a diagram illustrating a multi-layer convolution processing procedure 600, in accordance with various aspects of the present disclosure. The multi-level convolution procedure 600 avoids the need to store the output of each intermediate convolutional layer, thereby reducing working memory requirements for intermediate data. That is, the multi-layer convolution processing 600 may provide a further advantage, where large blocks are processed (instead of one layer at a time).

The multi-layer convolution processing 600 includes processing through multiple "Conv+ReLU" layers for each (row, column) position, as shown in FIG. 6. For example, as shown in FIG. 6, the multi-layer convolution processing includes one or more of Operations 601-608. According to an embodiment, an image region (e.g., for each output (row, column) position, a region from an input buffer (e.g., a 3 pixel×3 pixel (3×3) region from a larger input buffer)) are obtained (Operation 601). The image regions include two or more image frame regions. Although FIG. 6 shows a #1-#9 region (9 regions), the number of regions may be greater than or larger than 9, or less than 9. Moreover, the number of regions may be limited by the amount of intermediate memory.

Further, a same-sized first filter (e.g., 3×3) is used to perform an element multiply function (Operation 602A). A compute sum function is also performed (Operation 603A). A ReLU function is performed (Operation 604A). For example, as shown in FIG. 5, the ReLU function may be:

$$\text{sum}=(\text{sum}>0)?\text{sum}: 0) \quad [\text{Equation 1}]$$

Then, for a second same-sized filter (e.g., 3×3) the element multiply function (Operation 602B) is performed followed by a compute sum function (603B) and a ReLU function (604B).

Convolution output values are stored in output memory (Operation 605). For example, convolution output values may include values of the convolution output (e.g., after ReLU or other nonlinear activation), which may also be referred to as activations or feature maps, are stored in output memory for a given layer (or multiple given layers). A check is performed to determine whether the Multi-Layer Convolution Processing has processed each of the spatial coordinates (Operation 606). If each of the spatial coordinates has not been processed, pointers are incremented (Operation 607) and a loop that causes Operations 601-606/607 to restart (to be performed again) is used (Operation 608).

After neural network processing, the DNN output may be postprocessed, in accordance with various embodiments. In this case, bounding boxes are decoded based on anchor boxes, and overlapping bounding boxes are removed via non-maximum suppression. This may be similar to the postprocessing for SSD, however, to reduce computational complexity, first order linear approximations may be used in place of the logarithm and exponential functions.

Single Object Class Detection Processing

Figure 7:
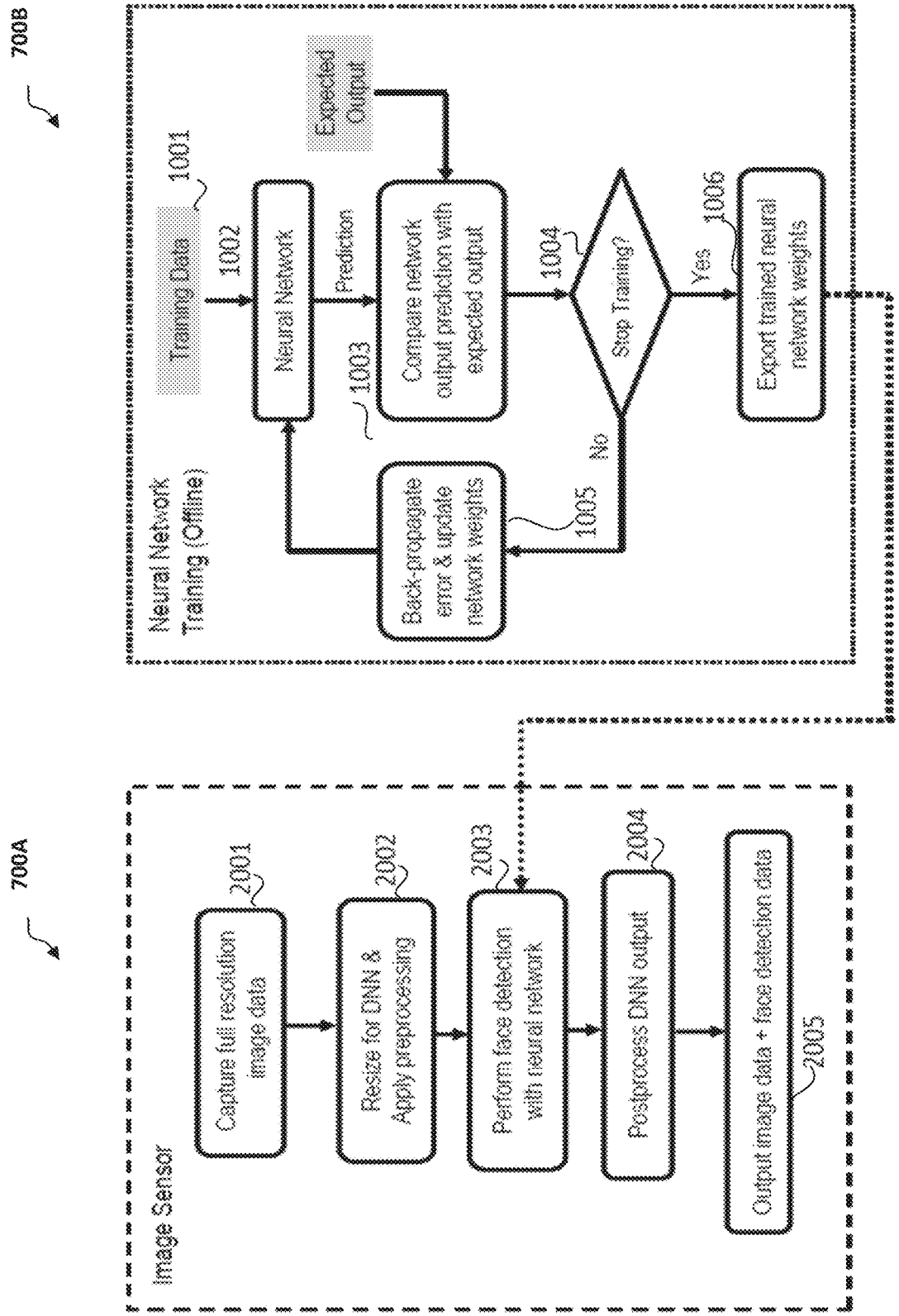
FIG. 7 is a flow chart illustrating a process/method of an image sensor, in accordance with various aspects of the present disclosure.
Figure 8:
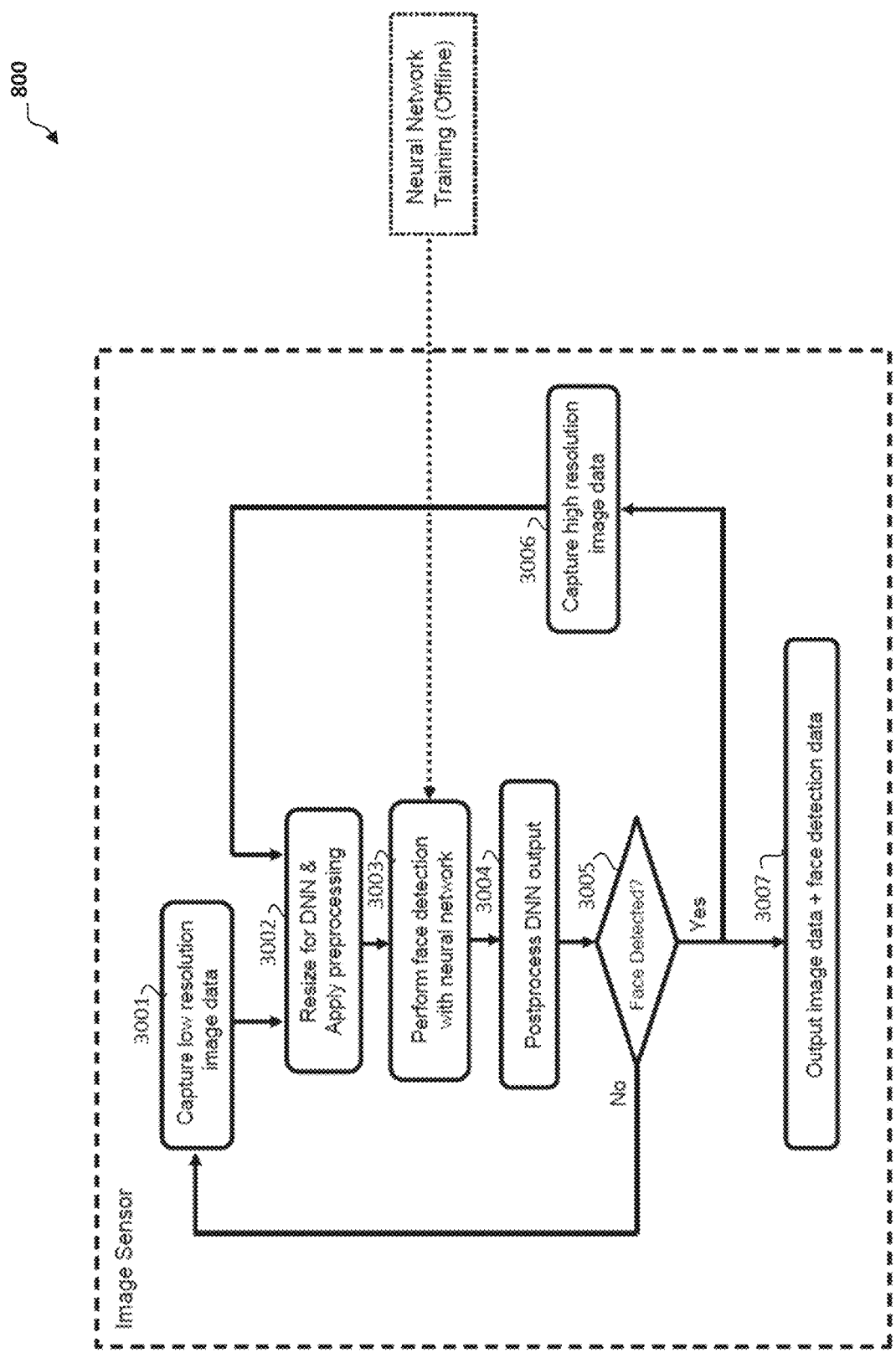
FIG. 8 is a flow chart illustrating a low resolution mode method of an image sensor, in accordance with various aspects of the present disclosure.
Figure 9:
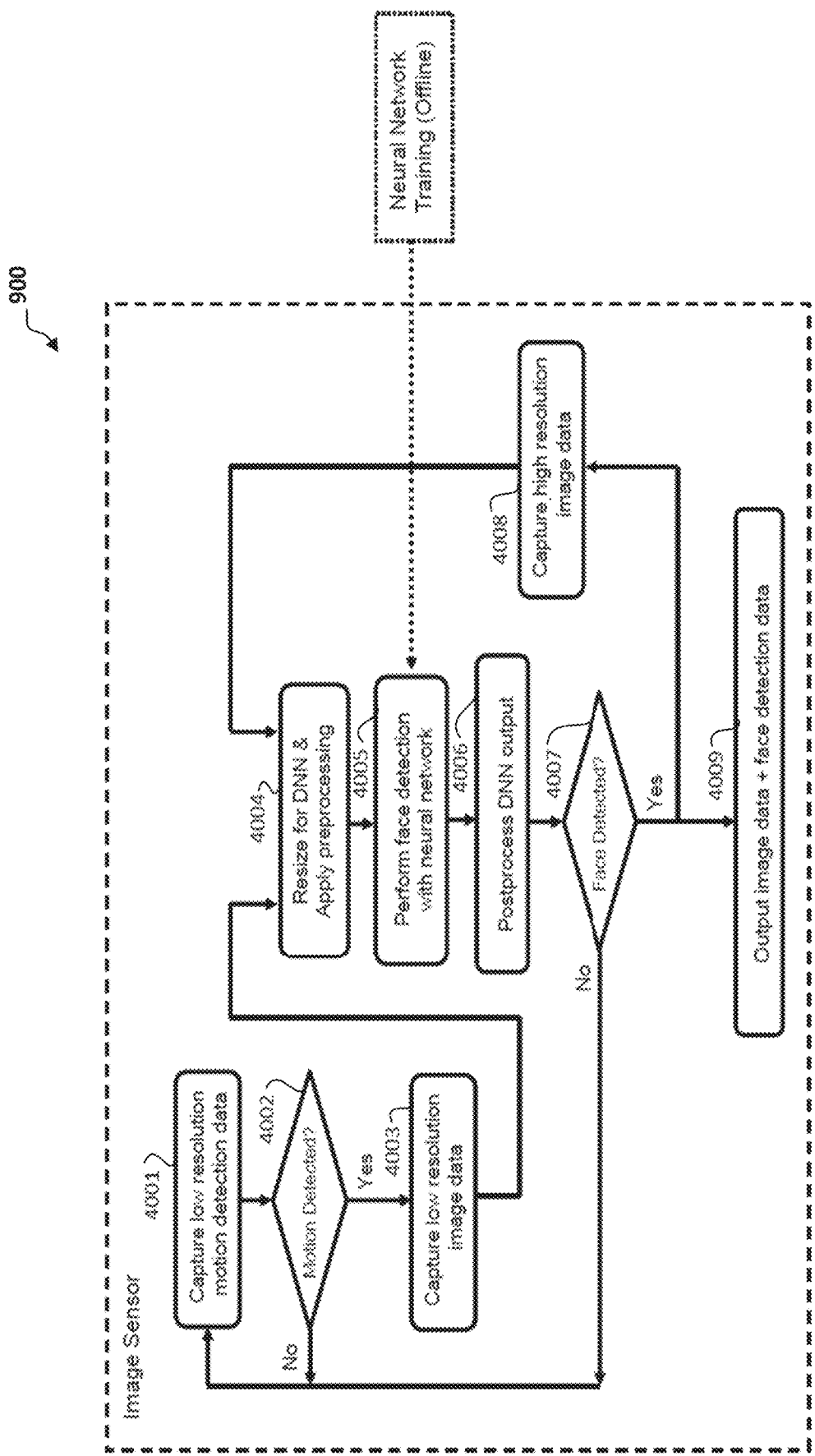
FIG. 9 is a flow chart illustrating a low resolution mode method of an image sensor, in accordance with various aspects of the present disclosure.

In addition to the physical sensor implementation of the disclosed face detection DNN 400, FIGS. 7-9 illustrate various embodiments related to how the face detection processing may be integrated into an image processing pipeline.

FIG. 7 includes a flow chart illustrating an example process/method 700A of an image sensor, in accordance with various aspects of the present disclosure. As illustrated in FIG. 7, the image sensor may capture a full resolution frame image (Operation 2001), and each full frame image is processed by the face detection DNN to determine the bounding boxes of any and all faces in the image region (Operation 2003). The captured image and the bounding boxes of any detected faces may then be transmitted off-chip (off-sensor)(Operation 2005). Between Operations 2001 and 2003, resizing and preprocessing (Operation 2002) may occur to the frame image, and between Operations 2003 and 2005, postprocessing of the DNN output may occur (Operation 2004).

According to an embodiment, the face detection DNN may use Sling Shot Multibox Detector (SSD) (an object detection neural network architecture) with one or more modifications to adapt it to perform face detection in hardware on an image sensor. The one or more modifications, which may occur during training, preprocessing and/or postprocessing, may include one or more of: (i) reduced image input size (e.g., to 160×120 and/or to grayscale), (ii) reduce the number of output channels in each layer of the face detection DNN, (iii) adjust the convolution stride in some layers of the DNN, (iv) reduce the number of anchor boxes of the DNN, and (v) reduce the number of object classes to 1 (e.g., face).

Prior to neural network processing, the input data must be preprocessed. In this case, standard preprocessing is performed, with data normalization to −1 to 1 and resizing of the data to the DNN input size (e.g., 160×120). This is in addition to any standard image signal processing (ISP) processing (e.g. demosaicing, denoising, etc.) that occurs.

After neural network processing, the DNN output must be postprocessed. In this case, bounding boxes are decoded based on anchor boxes, and overlapping bounding boxes are removed via non maximum suppression. This is similar to the postprocessing for SSD, however, to reduce computational complexity, first order linear approximations are used in place of the logarithm and exponential functions.

Low-Resolution Mode with Single Object Class Detection DNN

FIG. 8 is a flow chart illustrating a low-resolution image data mode method 800 of an image sensor, in accordance with various aspects of the present disclosure. As illustrated in FIG. 8, the low-resolution mode method 800 includes the image sensor operating in a low-resolution image data (low-power) mode until the face detection DNN determines the presence of a human face. The low-resolution image data mode method 800 includes capturing low resolution image data (Operation 3001), resizing for DNN and applying preprocessing (Operation 3002), performing facial detection with neural network (Operation 3003), performing post-processing of DNN output (Operation 3004) and determining whether a face has been detected (Operation 3005). If a face has not been detected (Operation 3005=No), the low-resolution mode method 800 may loop (i.e., perform Operations 2001-2005 again). If a face has been detected (Operation 3005=Yes), the method 800 switches the sensor to full-resolution mode and continue by capturing full-resolution images (Operation 3006) until the face detection DNN determines the absence of any human faces (Operation 3005). After detecting the absence of any human faces, the image sensor switches back to low-resolution mode. The method 800 further includes outputting image data and the face detection data (Operation 3007) to an off-sensor electronic device (e.g., CPU or GPU).

Ultra-Low-Power Mode with Single Object Class Detection DNN

FIG. 9 is a flow chart illustrating an ultra-low-power mode method 900 of an image sensor, in accordance with various aspects of the present disclosure. Again, a face object is used as an example for the single object class but other single object classes (or even a limited set of multiple object) could be used. As illustrated in FIG. 9, in the ultra-low-power mode method 900, the image sensor operates in a "motion detect" sensing mode until a change in the received illuminance triggers a wake-up to the low-resolution mode method 800 of FIG. 8. In the ultra-low-power mode method 900, if a face is not detected by the face detection DNN, either from the low-resolution image or the high-resolution image, the sensor may loop/switch back to the ultra-low-power motion detect mode. The ultra-low-power mode method 4001 includes one or more of Operations 4001-4009. For example, the ultra-low-power mode method 4001 includes capturing low resolution motion detection data (Operation 4001) and determining whether a motion has been detected (Operation 4002). If a motion has not been detected (Operation 4002=No), Operations 4001 and 4002 may be repeated continuously (looping) until a motion has been detected. If a motion has been detected (Operation 4002=Yes), Operations 4003-4009 may be performed. Operations 4003-4009 may correspond to Operations 3001-3007 and have the same or similar functionality.

Training Single Object Class Detection DNN

The procedure 700B for training the face detection DNN (e.g., face detection DNN 400) according to an embodiment is described in FIG. 7. The training method 700B may include one or more of Operations 1001-1006 as shown in the second flow chart of FIG. 7. The training of the face detection DNN may be performed off-sensor, for example on a central processing unit (CPU) or graphics processing unit (GPU), and the trained weights are loaded into the on-sensor memory (Operation 1006). The training method 700B may include obtaining training data (Operation 1001) (e.g., collecting images or image frames), performing prediction using the neural network (Operation 1002), comparing network output prediction with expected output (Operation 1003), and determining whether training should stop (Operation 1004). If it is not determined to stop the training (Operation 1004=No), error backpropagation and network weights update may be performed. DNN training involves iterative minimization of a loss function through backpropagation. If it is determined to stop the training (Operation 1004=Yes), the trained neural network weights may be exported to the image sensor (Operation 1006).

According to an embodiment of the disclosure, an electronic device may comprise a processor configured to: collect captured images, as training data, from a database; perform prediction using a single object class detection neural network; compare predicted output from the single object class detection neural network (DNN) with expected output; perform error backpropagation and network weights update based on the comparison; and export the trained neural network weights to an on-sensor memory of a stacked image sensor (or an electronic device comprising the stacked image sensor), wherein the single object class detection DNN receives an image region as input and outputs, as object detection data, a set of bounding boxes indicating the location of any and all faces in the input image region, and the single object class detection DNN is configured such that the output size for each convolutional block and each inverted residual block of the single object class detection DNN is no larger than available working memory in the stacked image sensor. The exporting of the trained neural network weights may include transmitting the trained neural network weights, over a network, via a network communication interface to an external electronic device (e.g., camera, smartphone) having a stacked image sensor. The single object class may include a face object class, a pedestrian object class, or other suitable object classes, or a limited set of object classes (e.g., multiple object classes)

CONCLUSION

With regard to the processes, systems, methods, heuristics, etc. described herein, it should be understood that, although the operations of such processes, etc. have been described as occurring according to a certain ordered sequence, such processes could be practiced with the described operations performed in an order other than the order described herein. It further should be understood that certain operations could be performed simultaneously, that other operations could be added, or that certain operations described herein could be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of the disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A stacked image sensor comprising:
a pixel array layer configured to capture an image and transfer image data of the captured image; and
a logic and single object class detection deep neural network (DNN) layer, the logic and single object class detection DNN layer including a single object class detection DNN, wherein
the logic and the single object class detection DNN layer is configured to:
receive the image data directly from the pixel array layer;
perform preprocessing of the image data to generate preprocessed image data;
perform single class object detection with the single object class detection DNN using at least a portion of the preprocessed image data;
perform postprocessing of single object class detection data output by the single object class detection DNN; and output the image data in combination with the post-processed single object class detection data to a communication bus of an electronic device, and wherein the logic and single object class detection DNN layer is configured to implement a feature extractor module, a box predictor module and a class predictor module, each of which comprise a plurality of convolutional blocks and inverted residual blocks.

2. The stacked image sensor of claim 1, wherein the single object class is a face object.

3. The stacked image sensor of claim 1, wherein the pixel array layer is stacked on the logic and single object class detection DNN layer.

4. The stacked image sensor of claim 1, wherein the logic and single object class DNN layer receives an image region as input and outputs, as the single object class detection data, a set of bounding boxes indicating a location of any and all instances of the single object class in the input image region.

5. The stacked image sensor of claim 1, wherein the logic and single object class detection DNN layer is further configured to control an output size for each convolutional block and each inverted residual block of the single object class detection DNN to be no larger than 100 kB.

6. The stacked image sensor of claim 1, wherein a total memory size of weights in all convolutional blocks and all inverted residual blocks is lower than 100 kB.

7. The stacked image sensor of claim 1, wherein a subset of convolution blocks and/or inverted residual blocks are implemented as multi-level convolutions where multiple convolution layers are computed together for a given spatial coordinate, rather than computing each entire convolution for all spatial coordinates.

8. The stacked image sensor of claim 1, wherein the logic and single object class detection DNN layer is further configured to: switch between a low-resolution capture mode and a high-resolution capture mode of the stacked image sensor based on a presence or an absence of a detected single class object, wherein the stacked image sensor operates in the low-resolution capture mode until the single object class detection DNN determines the presence of a the single class object.

9. The stacked image sensor of claim 1, wherein the preprocessing of the image data includes reducing a resolution of the image data.

10. The stacked image sensor of claim 1, wherein the preprocessing of the image data includes converting to grayscale.

11. A stacked image sensor comprising:
a pixel array layer configured to capture an image and transfer image data of the captured image; and
a logic and single object class detection deep neural network (DNN) layer, the logic and single object class detection DNN layer including a single object class detection DNN, wherein
the logic and the single object class detection DNN layer is configured to:
receive the image data directly from the pixel array layer;
perform preprocessing of the image data to generate preprocessed image data;
perform single class object detection with the single object class detection DNN using at least a portion of the preprocessed image data;
perform postprocessing of single object class detection data output by the single object class detection DNN; and
output the image data in combination with the post-processed single object class detection data to a communication bus of an electronic device,
wherein the postprocessing of the single object class detection data output by the single object class detection DNN includes using first order linear approximations in place of logarithm and exponential functions.

12. A stacked image sensor comprising:
a pixel array layer configured to capture an image and transfer image data of the captured image; and
a logic and single object class detection deep neural network (DNN) layer, the logic and single object class detection DNN layer including a single object class detection DNN, wherein
the logic and the single object class detection DNN layer is configured to:
receive the image data directly from the pixel array layer;
perform preprocessing of the image data to generate preprocessed image data;
perform single class object detection with the single object class detection DNN using at least a portion of the preprocessed image data;
perform postprocessing of single object class detection data output by the single object class detection DNN; and
output the image data in combination with the post-processed single object class detection data to a communication bus of an electronic device, and
wherein the logic and single object class detection DNN layer is further configured to:
capture low resolution motion detection data;
determine whether a motion has been detected; and
based on the motion being detected, switch between a low-resolution capture mode and a high-resolution capture mode of the stacked image sensor based on a presence or an absence of a detected object of the single object class.

13. A stacked image sensor comprising:
a pixel array layer configured to capture an image and transfer image data of the captured image; and
a logic and single object class detection deep neural network (DNN) layer, the logic and single object class detection DNN layer including a single object class detection DNN, wherein
the logic and the single object class detection DNN layer is configured to:
receive the image data directly from the pixel array layer;
perform preprocessing of the image data to generate preprocessed image data;
perform single class object detection with the single object class detection DNN using at least a portion of the preprocessed image data;
perform postprocessing of single object class detection data output by the single object class detection DNN; and
output the image data in combination with the post-processed single object class detection data to a communication bus of an electronic device, and
wherein the logic and single object class detection DNN layer is further configured to: switch between a low-power motion detection mode, a low-resolution capture mode, and a high-resolution capture mode of an image sensor based on a change in received illuminance and a presence or an absence of a detected object of the single object class.

14. A method comprising:
storing a single object class deep neural network (DNN) in a logic and single object class detection DNN layer of a stacked image sensor;
capturing, by a pixel array layer of the stacked image sensor, an image;
transferring, by the pixel array layer, image data of the captured image to the logic and single object class detection deep neural network (DNN) layer of the stacked image sensor;
performing, by the logic and single object class detection DNN, preprocessing of the image data to generate preprocessed image data;
performing, by the logic and single object class detection DNN layer, single object class detection using at least a portion of the preprocessed image data as input;
performing, by the logic and single object class detection DNN, postprocessing of single object class detection data output by the single object class detection DNN; and
outputting, by the logic and single object class detection DNN, the captured image in combination with the postprocessed single object class detection data to a communication bus of an electronic device,
wherein the single object class detection DNN is configured such that an output size for each convolutional block and each inverted residual block of the single object class detection DNN is no larger than available working memory in the stacked image sensor.

15. The method of claim 14, wherein the single object class is a face object.

16. The method of claim 14, wherein the single object class detection DNN receives an image region as input and outputs, as the single object class detection data, a set of bounding boxes indicating a location of any and all objects of the single object class in the input image region.

17. An electronic device comprising:
a processor,
a memory,
an optical lens;
a communications bus; and
a stacked image sensor, wherein
the stacked image sensor comprises:
a pixel array layer configured to capture an image and transfer image data of the captured image; and
a logic and single object class detection deep neural network (DNN) layer, the logic and single object class detection DNN layer including a single object class detection DNN,
the logic and the single object class detection DNN layer is configured to:
receive the image data directly from the pixel array layer;
perform preprocessing of the image data to generate preprocessed image data;
perform single object class detection with the single object class detection DNN using at least a portion of the preprocessed image data;
perform postprocessing of single object class detection data output by the single object class detection DNN; and
output the image data in combination with the postprocessed single object class detection data to the communications bus, and
wherein the logic and single object class detection DNN layer is configured to implement a feature extractor module, a box predictor module and a class predictor module, each of which comprise a plurality of convolutional blocks and inverted residual blocks.

18. The electronic device of claim 17, wherein the single object class is a face object.

* * * * *